Dec. 29, 1964 C. D. GIBSON 3,163,250
NARROW AISLE MATERIAL HANDLING TRUCK
Filed June 9, 1960 2 Sheets-Sheet 1
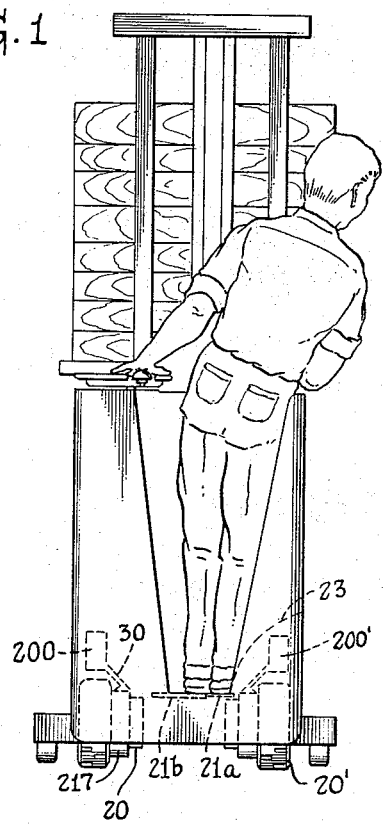
FIG.1
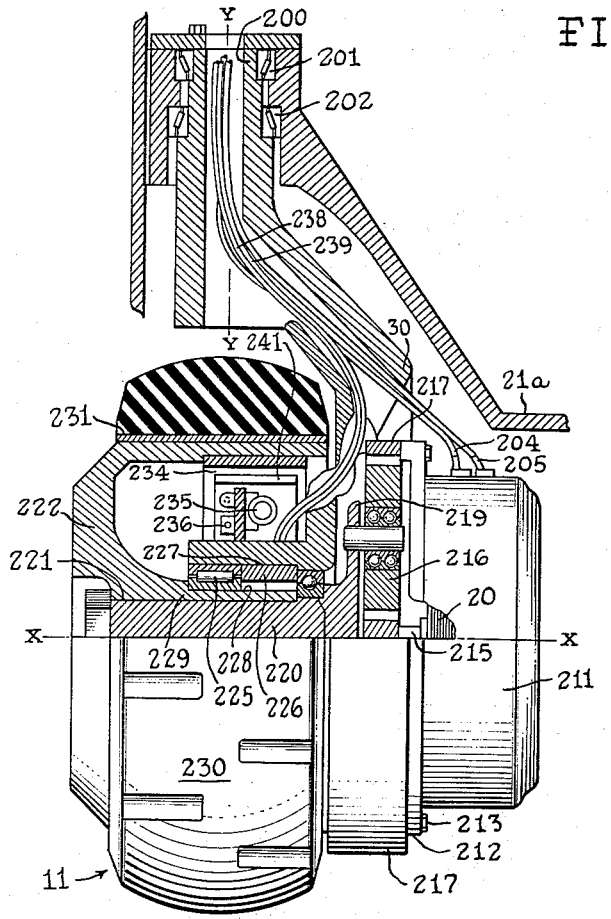
FIG.3
FIG.2
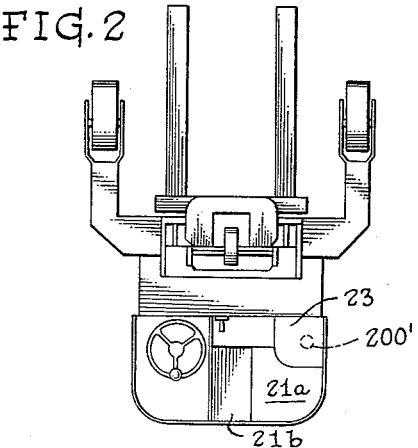
FIG.5
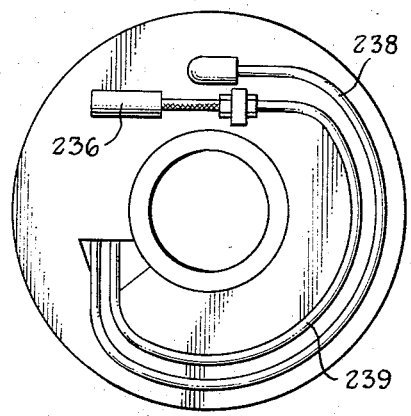
INVENTOR
CHRISTIAN D. GIBSON
BY
ATTORNEY

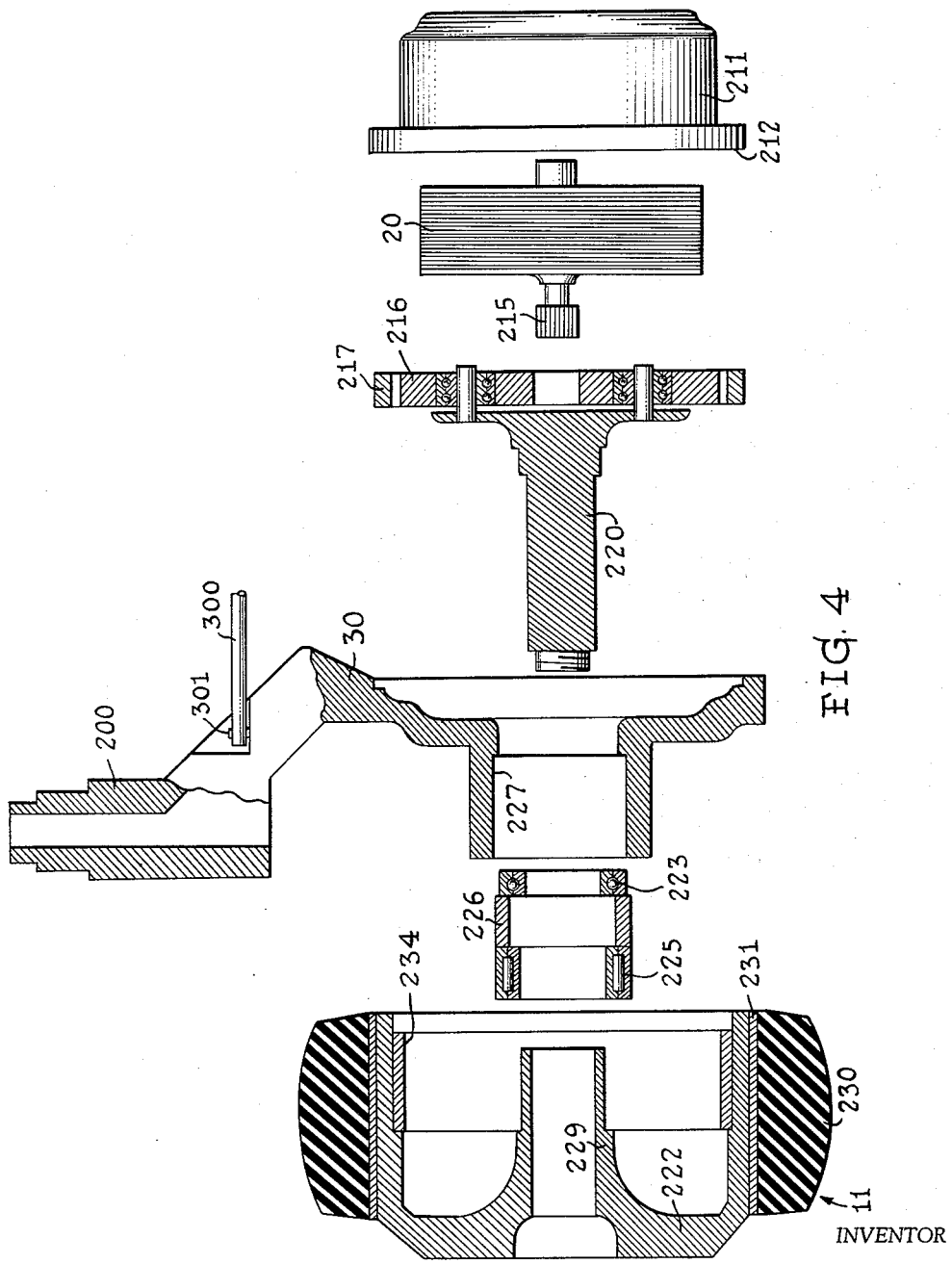

United States Patent Office 3,163,250
Patented Dec. 29, 1964

3,163,250
NARROW AISLE MATERIAL HANDLING TRUCK
Christian D. Gibson, Greene, N.Y., assignor to The Raymond Corporation, Greene, N.Y., a corporation of New York
Filed June 9, 1960, Ser. No. 34,982
6 Claims. (Cl. 180—43)

This invention relates to power driven material handling trucks of a general type widely used in factories and warehouses to pick up goods carried on skids or pallets, transport them to a desired location, and deposit them, usually in stacks or tiers.

Considerable savings can be effected in warehousing if aisles can be reduced to minimum width, and much effort has been devoted to provision of trucks having extremely short turning radii which are nevertheless laterally stable. One successful and widely-used "narrow-aisle" truck construction is disclosed in my prior Pat. No. 2,564,002 granted August 14, 1951, and in many respects the present invention may be regarded as an improvement thereon. The patented device combines the advantages of fifth wheel steering so far as shortened turning radius is concerned, with the advantages of four wheel support so far as lateral stability is concerned, by providing a combined driving and steering wheel near one rear corner of the truck and a swivel-mounted caster wheel near the other rear corner of the truck. Ideal space for the operator's stand is provided immediately above the swivel caster, thereby locating the operator near one edge of the truck to enhance visibility around the load being carried. While the invention of Pat. No. 2,564,002 has met with considerable success, the fact that it employs but a single driving wheel has proven to be a limitation, sometimes tending to discourage use of such trucks up steep ramps, over bridgeplates and on rough floors. The use of a single off-center drive wheel and one castered wheel in accordance with my prior patent also sometimes caused an undesired "slewing" when very sudden starts and stops were effected, and the use of dual drive wheels prevents such "slewing." It is a principal object, therefore, of the prevent invention, to provide a truck having all the advantages of my prior invention, but which also is driven by *two* steerable rear driving wheels, so that better traction may be obtained.

Reference to my abovementioned prior patent shows that the single steerable driving wheel used therein is driven by a assembly of vertically disposed elements, including the driving wheel, a sizeable speed reducer gearing unit and the electrical driving motor, all mounted so as to provide what might be termed a "tall vertical stack." It perhaps would be obvious to substitute a second similar stack for the swivel caster on the other rear corner of the truck, but this would be possible only if the operator's position were moved to the *middle* rear of the truck, as the operator's platform clearly cannot be located above any drive assembly as high as the usual vertically-stacked drive assembly, and must be maintained about one step above floor level, so as to be easily accessible, and also so as not to require undue headroom when the operator stands erect. Unless standing operator platforms are kept very near the floor, truck operators experience difficulty in passing through doorways, for example, or in traveling elsewhere where headroom is limited. Location of the operator at the side so greatly increases visibility around and past wide and/or bulky loads, however, that the above suggested obvious modification is recognized as wholly unsatisfactory for many applications.

The present invention overcomes the above described difficulty by provision of a new narrow-aisle lift truck configuration including a novel combination "motor-wheel" drive assembly which occupies a very limited amount of vertical space. The new motor-wheel assembly is constructed extremely compactly, so as to minimize also its required horizontal length, which allows turning through short radii. Prior art truck wheels in general have been carried by axles which were journalled at two ends, requiring that some axle-mounting parts or hubs protrude sidewise beyond their respective driving wheels of the truck, thus requiring less track width between wheels, and hence decreased lateral stability, in a given overall truck width. By providing a motor wheel assembly wherein the axle is supported on one end only, on the inboard side of each wheel, I may mount the steerable driving wheels near the extreme edges of the truck, gaining the greatest possible lateral stablility in a truck of given width.

As mentioned above, the high vertical drive assembly shown in my prior patent comprised a vertical stack of a wheel, speed reduction gearing, a drive motor with its shaft mounted vertically, and a brake on the upper end of the motor shaft. Another quite common prior art arrangement which attempts to lessen wheel drive assembly height utilizes a horizontal shaft motor mounted just above the drive wheel, with gearing connecting the motor shaft and the drive wheel and with a brake on the motor shaft. While that arrangement provides some reduction in wheel drive assembly height, it falls far short of providing the desired compactness. In the present invention, however, the drive wheel, motor, brake and gearing are all coaxially mounted, so that minimum possible vertical space is required, and an operator's platform mounted above the motor wheel assembly can be an easy short step from the floor. Thus it is a further important object of the invention to provide an improved compact steerable motor-wheel assembly for use on materials handling vehicles.

While a number of combination "motor-wheel" assemblies are known for various prior art vehicles, few if any of them are steerable. Provision of a steerable or dirigible "motor-wheel" in the past uniformly has required special techniques such as slip rings, or extremely flexible cables, to transmit electrical power and control from the body of the vehicle to the steerable motor-wheel, and ball-joint swivel pressure connectors to transmit hydraulic pressure between the body of the vehicle and the steerable motor wheel. Since ball-joint swivel pressure connector and slip rings all are expensive and relatively unreliable, provision of a steerable motor-wheel which avoids such undesirable techniques has met a long felt need. Therefore, it is a further object of the invention to provide a steerable motor-wheel which avoids use of such techniques.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings in which:

FIG. 1 is a rear view of a lift truck constructed in accordance with the present invention. As illustrated an operator has been shown in position at the operator's station to illustrate the relative merits of the apparatus provided by the invention with respect to visibility around and past bulky loads.

FIG. 2 is a plan view of the truck of the present invention;

FIG. 3 is a sectional view through one form of motor-wheel-brake combination constructed in accordance with the present invention.

FIG. 4 is an exploded view illustrating the gearing arrangement of the motor wheel combination of FIG. 3.

FIG. 5 is a schematic view of a braking arrangement which may be used in the instant invention.

Overall Truck Configuration

The invention is shown in FIG. 1 as including a pair of dirigible combination "motor-wheel" units 11, each unit comprising a "pancake type" motor, a gear reduction assembly, brakes and a wheel, all mounted coaxially with respect to each other. On the left motor-wheel assembly hollow vertical stem 200 is journalled in bearings (not shown in FIG. 1) to pivotally carry wheel casting 30. Drive motor 20 and planetary reduction gearing at 217 are carried on the inner side of wheel casting 30, and a wheel, including internally mounted brake shoes and brake actuators, is carried on the outside of wheel casting 30, all as will be explained below in much more detail. The right motor-wheel assembly may be identical to the left assembly just described. Since no yoke surrounds each wheel, the outer edge of each wheel may virtually coincide with or establish the truck maximum lateral dimension, thereby insuring that maximum lateral stability possible for a given width truck is obtained.

It will be seen that each steerable motor-wheel assembly shown in FIG. 1 occupies minimum vertical space, so that operator platform 21a may be provided immediately above one motor, as shown, while still maintaining the operator platform at its desired elevation. The only portion of the right rear assembly extending above the operator's platform is stem 200', but since the stem occupies very little lateral space and may be located substantially at the right edge of the truck, operator's platform 21a may be located so as to cover substantially the right rear corner of the truck. By locating the operator's platform at the side of the rear portion of the truck, the truck operator can easily sight along the edge of any load being handled.

In the plan view of FIG. 2, it will be seen that stem 200' mounting right rear motor-wheel 20' is located near the right side of platform 21 inside a small stem well 23 located near the front right corner of platform 21a so as to cause minimum interference. Portion 21b of the operator's platform is spring-biased upwardly and mechanically connected to operate a "dead-man" switch and apply a "deadman brake." When the operator mounts the truck, his weight holds platform 21b down, maintaining the switch closed and the brake released. Hydraulic brakes to be shown in detail below, may be operated by the operator either by pushing on a brake pedal lever or by removing his weight from platform 21b.

Motor-Wheel

The novel dirigible motor-wheel assembly of the present invention is best understood by reference to FIGS. 3–5. In FIG. 1 it was shown that all of the parts related to the motor-wheel are disposed below the level of the operator's platform, except for a hollow stem upper portion 200 of the motor-wheel main casting. The hollow stem 200 is seen to extend upwardly from the wheel for a short distance, and to be journalled vertically in an upper set 201 and a lower set 202 of roller bearings, for rotation about a vertical axis Y—Y as the vehicle is steered by reciprocating drag link 300 pivotally connected to wheel casting by pivot means 301. Passing inside hollow stem 200, and located near the axis thereof are a number of power and control lines, including electrical leads 204, 205 to power motor 20, a hydraulic pressure line 238 to actuate a hydraulic wheel brake cylinder 235, and a Bowden cable 239 or equivalent utilized to actuate brake shoes for parking. Electrical conductors 204 and 205 are shown as passing vertically through hollow stem 200, and thence at an angle through a hollow inwardly sloping passage from which they emerge to connect to studs on the electric drive motor. Hydraulic line 238 and Bowden cable 239 are routed to the opposite side of the motor-wheel frame casting, to connect, respectively to hydraulic wheel brake cylinder 235 and to a pair of brake shoes, only one of which is shown in FIG. 3. It is very important to note that the power and control leads all are led through hollow vertical stem 200 near the axis Y—Y thereof, and to understand that because the leads are located at or near said axis, no appreciable changes in length are required as the motor-wheel is turned, so that no appreciable flexing of the leads occurs, but merely a gentle twisting and untwisting as the wheels are turned back and forth. Because the Y—Y axial location greatly minimizes or eliminates flexing, and also because the leads are protected from outside mechanical damage, the electrical and hydraulic connection arrangement of the invention is very reliable and trouble-free, and much preferred over the slip ring and ball-joint arrangements of the prior art.

As shown in FIG. 3, the housing 211 of motor 20 is provided with a flange 212, which is bolted, as by means of machine screws 213, to the motor-wheel frame casting 30. The casting will be seen to include a mounting portion which is offset from but parallel to axis Y—Y, upon which the motor and wheel are mounted. Pinioned shaft 215 of motor 20 meshes with three planet gears 216, only one of which is shown, which in turn engage ring gear 217. Ring gear 217 is rigidly affixed to the casting member so as not to rotate about the motor-wheel axis X—X, and hence the centers of planet gears 216 are constrained to describe a circle around the motor-wheel axis X—X as they are rotated by toothed shaft 215. The centers of planet gears 216 are arranged 120 degrees apart around the circumference of shaft 215, and three cooperating arms 219 of spider 220 engage the three planet gears, thereby rotating spider 220 as motor output shaft 215 rotates. The precise form of planetary gear reduction shown is especially well-suited to practice of the invention, but numerous other types of speed reduction gearing may be substituted without departing from the invention. The external surface 221 of spider 220 is splined to mesh with and rotate wheel casting 222 and thereby propel the truck. It may be noted that the driving connection between motor 20 and wheel 222 has not involved any bearings subject to the static weight load of the truck. Ball bearing 223, and roller bearing 225, with spacer 226 between them, fit between the internal bearing surface 227 of the hub portion of the motor-wheel frame 30 and the external surface 228 of shaft portion 229 of wheel casting 222. A solid rubber tire 230 is shown pressed on the external felly surface 231 of the wheel. Cushion tires and inflated tires obviously may be substituted, if desired, for some applications.

Wheel casting 222 is provided with an internal braking surface 234, and a hydraulic operating cylinder means 235 and mechanical cable means 236 are provided for braking both during travel and parking; and for deadman braking. Due to the ease with which a hydraulic brake pressure hose 238 and a Bowden wire parking brake cable 239 may be routed down hollow stem 200 and into the interior of wheel casting 222, both forms of braking may be provided simply and economically; and because the brake shoe 241 is mounted entirely inside wheel casting 222, the use of braking does not require added space, either vertically or axially, for the motor-wheel unit. Furthermore, it should be noted that there is an advantage in providing braking on a large radius surface, such as the inner surface 234 of wheel 222 rather than on a lesser radius, so that lesser braking pressures are necessary and longer brake shoe life can be expected with the present invention than in the case of motor-wheel assemblies where braking is accomplished inside the motor or on the motor shaft.

A further feature of the dirigible motor-wheel assembly is its cantilever suspension, with no outboard leg needed to support the wheel, so that very little of the truck need extend outboard of the wheel and outside pivot axis Y—Y, thereby providing maximum lateral stability for a truck of given width. Also being provided with the "floating axle" type of suspension shown, the driving connection between the motor and the wheel does not include parts subject to the static weight load of the truck. The motors of the motor-wheel assembly preferably are direct-current series-wound reversible motors, and their speeds and directions of rotation may be controlled in diverse conventional ways by motor control systems well-known in the art.

It will thus be seen that the objects set forth above, among those made apparent from the preceding description, are efficiently attained, and since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A power-driven steerable materials-handling truck, comprising, in combination: a base frame; a pair of front supporting wheels; a pair of rear steering and driving motor wheel assemblies each located at an opposite rear corner of said frame; and an operator platform adapted to accommodate a standing operator located above one of said motor wheel assemblies, each of said motor wheel assemblies comprising a frame including a hollow vertical stem portion journalled in bearings at its upper end for rotation about a vertical axis to steer said drive wheel, a mounting plate portion offset therefrom in a vertical plane and a hub portion extending horizontally from said plate portion toward said vertical axis; a drive wheel supported on said hub portion substantially on said vertical axis; motive means mounted on said mounting plate on the side opposite from said drive wheel; and energization lines connected to operate said motive means passing through said hollow vertical stem near said axis, thereby to minimize flexing of said energization lines as said stem is turned for steering.

2. A steerable drive motor wheel assembly, comprising in combination: a first and second vertical stem assembly, each one of said vertical stem assemblies adapted to be journalled in bearings carried on a vehicle and rotated about a vertical axis to steer said vehicle; a mounting plate portion below each of said stem assemblies and offset inwardly from both of said vertical axes; a first and second motor and speed reduction gearing mounted on the inboard sides of each of said mounting plate portions; a first and second drive wheel and hydraulic brake assembly mounted on the outboard sides of each of said mounting plate portions, coaxially with each of said motors, and said reduction gearing; and cantilever shaft means connected to each of said motors through said reduction gearing and extending outwardly through said mounting plate portion to carry said wheels, and further operable through said reduction gearing to drive said wheel.

3. An assembly according to claim 2 in which each of said drive wheels comprises a hollow cylinder having an internal braking surface, and in which said hydraulic brake assembly includes a braking wheel cylinder and a pair of brake shoes adapted to be spread against each of said braking surfaces by operation of said braking wheel cylinder.

4. A power-driven material-handling truck, comprising in combination: a base frame; a pair of front supporting wheels journalled on straddle arms projecting forward from said base frame; a pair of rear steering and driving motor-wheel assemblies, each mounted near a respective rear corner of said base frame, each of said assemblies including a hollow vertical stem journalled in said base frame and rotatable about a respective vertical axis to steer said truck, a mounting portion depending from and offset from said axis, a motor mounted on said mounting portion, a wheel mounted coaxially with said motor, and power and control lines led down said stem from inside said truck to connect to said motor mounted on said mounting portion; an operator platform adapted to accommodate a standing operator located above one of said motor-wheel assemblies and located adjacent one side of said truck; and vehicle drive apparatus located above the other of said motor-wheel assemblies and adjacent the other side of said truck.

5. Apparatus according to claim 4 having planetary gear reduction means interposed between said motor and said wheel of each of said motor-wheel assemblies, wherein said gear reduction means comprises an internally-toothed ring gear rigidly fixed with respect to the housing of said motor, a pinion on the shaft of said motor, a plurality of planet gears engaging said pinion and said ring gear, a spider having a plurality of arms engaging respective of said planet gears so as to rotate said spider, said spider being splined to connect with said wheel.

6. Apparatus according to claim 4 in which said wheel of each of said motor-wheel assemblies is supported and driven from one side only, so that the outer side of said wheel may be mounted flush with the side of said truck without projecting laterally beyond the side of the truck.

References Cited by the Examiner
UNITED STATES PATENTS

| | | | |
|---|---|---|---|
| 693,994 | 2/02 | Bowker | 180—65 X |
| 1,313,937 | 8/19 | Brinton | 180—43 |
| 1,745,598 | 2/30 | Brinton | 180—45 |
| 2,435,021 | 1/48 | Seider | 180—13 X |
| 2,564,002 | 8/51 | Gibson | 180—65 X |
| 2,592,091 | 4/52 | Weaver | 180—13 |
| 2,706,008 | 4/55 | Voigt | 180—26 |
| 2,801,702 | 8/57 | Armington | 180—43 B |
| 2,899,093 | 8/59 | Morrell | 180—26 X |
| 2,942,677 | 6/60 | Gray | 180—26 X |
| 2,949,040 | 8/60 | Bixby | 180—75 X |

FOREIGN PATENTS

| | | |
|---|---|---|
| 56,920 | 7/52 | France. |
| 973,140 | 9/50 | France. |
| 805,119 | 5/51 | Germany. |

PHILIP ARNOLD, *Primary Examiner.*

A. HARRY LEVY, *Examiner.*